United States Patent [19]

Manzara

[11] 4,268,657
[45] May 19, 1981

[54] FRICTION ELEMENT CONTAINING PHENOL-FORMALDEHYDE-ALKYL-PHENOL BINDER

[75] Inventor: Anthony P. Manzara, Stillwater, Minn.

[73] Assignee: Minnesota Mining and Manufacturing Company, Saint Paul, Minn.

[21] Appl. No.: 101,728

[22] Filed: Dec. 10, 1979

[51] Int. Cl.³ .................... C08G 8/12; C08L 61/10
[52] U.S. Cl. .................... 528/155; 74/214; 74/215; 74/216; 260/33.4 R; 260/38; 260/998.13; 264/331.22; 528/137; 528/140; 528/141; 528/143; 528/144; 528/145; 528/147
[58] Field of Search ............... 528/155, 137, 140, 141, 528/143, 144, 145, 147; 260/38, 998.13

[56] References Cited

U.S. PATENT DOCUMENTS

| | | | |
|---|---|---|---|
| 2,025,951 | 12/1935 | Kuzmick | 260/38 X |
| 2,114,121 | 4/1938 | Bender | 260/38 |
| 2,554,128 | 5/1951 | Spokes | 260/38 X |
| 4,096,108 | 6/1978 | Webb et al. | 260/38 |

FOREIGN PATENT DOCUMENTS

47-13621 4/1972 Japan.

OTHER PUBLICATIONS

Chem. Abstracts, vol. 78, 160466, 1973, Ouchi et al.

*Primary Examiner*—Howard E. Schain
*Attorney, Agent, or Firm*—Cruzan Alexander; Donald M. Sell; Richard Francis

[57] ABSTRACT

Improved friction elements suited for use for example in an automotive or similar brake or in a clutch are provided by employing therein as a binder the reaction product of phenol, formaldehyde, and monoalkylphenol having from 4 to about 20 carbon atoms in the alkyl group. The mole ratio range of phenol:alkylphenol:formaldehyde is about 2:1–5:1–7 and the number of moles of phenol and alkylphenol combined exceeds the number of moles of formaldehyde. An improved method of making friction elements is also provided which uses such binder.

5 Claims, No Drawings

FRICTION ELEMENT CONTAINING PHENOL-FORMALDEHYDE-ALKYLPHENOL BINDER

BACKGROUND OF THE INVENTION

1. Field of the Invention

This invention relates to an improved friction element containing a binder comprising the reaction product of phenol, formaldehyde, and monoalkylphenol and a method of making such a friction element employing such a binder.

2. Prior Art

Various mechanical devices which are movable or have movable parts utilize frictional forces to transmit, slow or stop motion. This is accomplished by contacting a moving part with an immobilized part until the frictional forces between the contacting parts cause the moving part to slow sufficiently or to stop. Such devices are customarily referred to as brakes. A clutch on the other hand utilizes such frictional forces for engaging and disengaging movable parts.

Brakes for vehicles are of two main types, "disc" brakes and "drum" brakes. Disc brakes employ a disc or a plate located on the inboard face of a wheel and have positioned on opposite sides of the disc non-rotating brake shoes fitted on their contacting surfaces with friction pads of brake lining material. Mechanical or hydraulic linkages are provided to force the friction pads into engagement with the rotating disc and to release such engagement.

Drum brakes utilize non-rotating brake shoes having generally curved friction pads or brake linings on their surfaces which are forced into engagement with a brake drum which rotates with the wheel. The shoes are mechanically or hydraulically forced against the drum when appropriate braking force is applied. In each case, the normal position of the friction pad is that of being disengaged from the drum or disc.

The surface contacted by the brake lining is typically a hard, smooth, essentially non-wearing part, customarily made of steel, cast iron or aluminum. The friction pad is somewhat softer than the surface which it contacts, more resilient and adapted to provide the appropriate frictional surface. Such pads are typically replaceable and generally slowly wear away so they must be periodically replaced.

The necessary performance characteristics of the brake lining material forming such friction elements include dimensional stability, a relatively constant friction level as temperature is varied since heat is always generated in the braking operation, low lining wear and minimum wear of the brake drum or disc against which it is applied.

Such friction elements are generally formed of a fibrous thermally stable reinforcing material, various metallic or non-metallic powdered or particulate solid filler materials and a binder resin to hold the mass together. For the purpose of this application the ingredients contained in the friction elements other than the binder shall be referred to as "filler". This term is intended to include such conventional ingredients as particulate or powdered friction material; powdered, particulate or fibrous reinforcing materials; additives to assist in the dissipation of heat; and the like. The binder typically comprises about 5% to about 25% of the friction element with the balance of 95% to 75% being such filler.

There are two popular processes currently employed for the manufacture of such friction elements. The first involves mixing a powdered solid reactive cross-linkable B-stage binder resin with the requisite filler and optionally a suitable curative in a mixing device such as a blender. (Such curatives are compounds or mixtures which provide a reactive species to cross-link or cause cross-linking of the resin. Commonly used curatives include sulfur and formaldehyde donor compounds, such as hexamethylene tetramine.) The mix, which is loose and pourable, is first pre-formed and then transferred to a mold having a cavity of the appropriate size and shape wherein the mixture is heated and pressed until the binder resin flows to coat the filler and then cures producing a mass which may be machined, if required, to the appropriate shape.

The second process utilizes a liquid resin binder, dissolved in a suitable solvent if required, which is mixed with the desired filler and curative if needed, in a mixer to provide a homogeneous doughy mass. The mass is then processed into the appropriate shape by extrusion or roll molding to produce an uncured, or "green", shape which is dried to remove solvent, if used, then heated in an unconfined state to cure the binder.

Brake linings made with presently available liquid binders suffer some shortcomings. The major problem is a loss of effectiveness upon continuous heavy use of the brake, called "fade". This problem is apparent to the operator of a motor vehicle as an increase in the amount of pedal effort needed to slow or stop the vehicle. Fade is typically traceable to a decrease in the coefficient of friction as the brake linings absorb the heat of repeated stops, forcing the lining temperature higher and higher. This shortcoming leads to unpredictable and unsafe operating conditions. Laboratory testing of the brake linings made from such conventional resins confirm that they exhibit low friction at high temperature. In some cases, the coefficient of friction drops below 0.2 at temperatures as low as 650° F.

There are three main types of liquid binder resins presently utilized in the second process to produce the majority of brake linings. The first type is based on linseed oil which has been "bodied", i.e., modified to increase its molecular weight and viscosity. Such modification is typically carried out by heating the linseed oil in the presence of oxygen and/or a catalyst, causing some of the oil molecules to link together to form a cross-linkable reactive resin containing unsaturation which is curable in the presence of a sulfur curative. The second type liquid resin is based upon cashew nut shell liquid which has been "bodied" by heating in the presence of a strong acid. This results in a resin which contains both carbon- carbon unsaturation curable with sulfur or sulfur-containing compounds and reactive phenolic groups curable with formaldehyde donor compounds such as hexamethylene tetramine (commonly known as "Hexa"). The third type of binder liquid is an oil-modified phenolic resin which is prepared from condensation of phenol with various vegetable oil materials which soften and solubilize otherwise hard and insoluble phenolic resins. Some of the binders disclosed herein may be known in the chemical art but, as far as is known to applicant, none of the binders defined herein are known for use in friction elements. For example, Japanese Pat. No. 47-13621 discloses a resin prepared by the base catalyzed reaction of nonylphenol and formaldehyde with phenol, useful as a molding resin for electrical insulators and the like.

SUMMARY OF THE PRESENT INVENTION

The present invention provides a friction material which comprises conventional filler materials, i.e., reinforcing fillers, friction particles, heat dissipating additives, and the like, and employing a binder resin comprised of the reaction product of phenol, formaldehyde, and monoalkylphenol having from 4 to about 20 carbon atoms in the alkyl group. The mole ratio of phenol:alkylphenol:formaldehyde is about 2:1-5:1-7, preferably 2:1:2, and most preferably 2:1.14:2. The total number of moles of phenol and alkylphenol combined exceeds the total number of moles of formaldehyde. The ingredients and ratios are selected to provide a liquid or, when dispersed in a compatible solvent, a mixture which preferably has a viscosity not exceeding about 50,000 cps at 25° C. at no less than about 75% nonvolatile content.

The brake linings made according to the present invention exhibit unexpectedly high coefficients of friction of 0.3 or higher even at temperatures up to 900° F. and show significantly less increase in pedal effort for consecutive stops than friction elements made employing conventional binding systems.

DETAILED DESCRIPTION OF THE INVENTION

The ingredients selected to form the binder for the friction material of the invention are readily available. Formaldehyde, which is a gas under ambient conditions, is employed in commercially available liquid or solid forms. One available solid source of formaldehyde is paraformaldehyde which is a 91–93% active polymer of formaldehyde typically having a molecular weight on the order of 500 to 2000 with the balance being water. This material will depolymerize under the reaction conditions herein described to release formaldehyde to facilitate the reaction to produce the binder. The formaldehyde may also be introduced as a formaldehyde solution in water available in a form commercially identified as "Formalin" which typically contains on the order of 37 to 51% by weight formaldehyde.

Commercially available technical grade phenol may be employed without any purification steps to produce the defined resin binder.

The monoalkylphenol has from 4 to about 20 carbon atoms in the alkyl group. The alkylphenol compound may be represented by the general formula

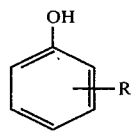

wherein R preferably is an alkyl group having from 4 to 20 carbon atoms, which may include carbon-carbon double bonds.

Suitable alkylphenols for this purpose include those wherein the alkyl group is selected from butyl, amyl, hexyl, cyclohexyl, heptyl, octyl, nonyl, decyl, undecyl, dodecyl, tridecyl, tetradecyl, pentadecyl, hexadecyl, heptadecyl, octadecyl, nonadecyl, eicosanyl, and the like.

Specifically useful and available alkylphenols include:
p-tert-Butylphenol
p-tert-Amylphenol
p-tert-Octylphenol
Nonylphenol
Dodecylphenol The resins to be used in the practice of this invention can be produced by any of several different methods. These methods each involve reacting formaldehyde, phenol and alkylphenol to produce a curable resin. Three methods are preferred.

The first method involves combining phenol and alkylphenol, and then reacting this mixture with formaldehyde to cause the formation of resin having randomly distributed phenol, alkylphenol and formaldehyde residue groups, with the elimination of water. The reaction preferably is carried out in the presence of a catalyst generally used for phenolformaldehyde reactions, e.g., sulfuric acid. Reaction temperatures of 70° C.–100° C. are preferred during the polymerization step of the preparation. At such temperatures the reaction can be accomplished in approximately 0.5–5 hours. The selection of ingredients should be made and the reaction carried out in a manner which avoids homopolymerization of the more reactive species while the other ingredients remain unreacted.

A preferred binder comprises phenol and alkylphenol in a mole ratio of phenol to alkylphenol from about 2:1 to about 2:5. Solubility in non-polar organic solvents generally improves with increasing amounts of alkylphenol within this range while cross-linkability improves with increasing amounts of phenol.

The ratio of phenols (phenol and alkylphenol) to formaldehyde controls the molecular weight of the resin. Generally speaking, the molar ratio of phenol to formaldehyde is greater than one. As the quantity of phenol is increased above the specified range, the molecular weight typically decreases and the less reactive phenol is left unreacted in the mixture. At lower ratios of phenol to formaldehyde than herein specified, the resultant resin may cross-link to a cured product, but such a product generally fails to provide an adequate binder material for friction elements.

The second method involves the preparation of a cross-linkable phenol capped resole of alkylphenol. In this reaction, the lower reactivity of the alkylphenol is circumvented by first reacting it to form a resole or bis-(hydroxy methyl) phenol, before introduction of phenol. The first step of the reaction is carried out with a basic catalyst, for example sodium hydroxide, under non-dehydrating conditions. One mole of alkyl substituted phenol is treated with at least 2 moles of formaldehyde at a temperature of 70°–110° C. for 1 to 6 hours. A convenient method of controlling the temperature involves use of a solvent, such as isopropyl alcohol, which boils at a suitable temperature. If excess formaldehyde is used, it may be necessary to remove the unreacted formaldehyde before proceeding to the next reaction step.

In the second step of the reaction, phenol is added to react with the bis-(hydroxymethyl) alkylphenol formed in the first step to complete the resin formation. The quantity of phenol to be added ranges from 1 to 2 moles of phenol per mole of methlolated alkylphenol. As the amount of phenol is decreased relative to the amount of methylolated alkylphenol, the molecular weight of the resin is increased. The phenol addition step may be accomplished under either acid or base catalysis and may be done under dehydrating conditions such as azeotropic distillation, vacuum distillation or ordinary distillation. The temperature range for this reaction preferably is 126°-200° C. It is convenient to observe water evolution as a means of monitoring this reaction, which typically takes place in 0.5 to 2 hours, depending on temperature.

A third method involves the preparation of a crosslinkable phenol-capped resole of ortho or para monoalkylphenol novolac. This resin type is prepared by a three-step sequence. In the first step alkylphenol with only two formaldehyde-reactive positions unsubstituted, such as an o-alkyl-or p-alkylphenol is reacted with formaldehyde under acid catalysis and dehydrating conditions to form a linear novolac. The average length of the novolac chain is controlled by the ratio of substituted phenol to formaldehyde, which can be 2:1 or lower. As this ratio is decreased toward 1:1, the novolac polymer is lengthened. Resins suitable for use in the practice of this invention can be made with substituted phenol:formaldehyde ratios of from about 2:1 to 1.2:1. The first reaction step is carried out with acid catalysis under dehydrating conditions at 80°-130° C. for 0.5-5 hours. It is convenient to mix the reactants with a water-immiscible solvent such as toluene and use azeotropic distillation to remove the water which is generated. By this method, the extent of reaction is also easily ascertained.

In the reaction second step, the novolac polymer is treated with formaldehyde under base catalysis to form terminal reactive hydroxymethyl groups on either end of the polymer. The conditions for this reaction are essentially similar to those for the first step in the second method of preparation. It is not necessary to remove the solvent but the acid catalyst must be neutralized and the mixture made basic. Formaldehyde is added at a molar ratio of 2 to 3 moles for each mole of novolac and the mixture is heated for 1-6 hours at a temperature of 70° C.-110° C. under nondehydrating conditions. If excess formaldehyde is used, it may be removed by water washing or by vacuum stripping at a relatively low temperature so as not to encourage undesired homopolymerization of the novolac units via formation of either methylene or benzyl ether linkages.

The third and final step of this sequence involves reacting hydroxymethyl terminated novolac units with phenol. The molar amount of phenol should be from 0.33 to 1.0 based on the number of moles of hydroxymethyl groups introduced in the previous step and the desired molecular weight range. Excess phenol may be used, if desired, to keep the molecular weight down. The reaction can be carried out with acidic or basic catalysis, at a temperature of 126°-200° C. for 0.5 to 10 hours, using dehydrating conditions such as distillation, azeotropic distillation or vacuum distillation.

The resins described above may be cured by conventional curatives such as "Hexa" in amounts on the order of 5 to 15% by weight curative per weight of resin solids. Curing may be accomplished by heating in the temperature range of about 120° C.-230° C., with cure times on the order of 0.5 hour to 10 hours, with longer cure times being required for lower temperatures, as may be expected.

The resins described above, as previously mentioned, may be diluted with compatible solvents to provide a physical state more amenable to processing. Preferably, the binder is introduced into the friction element formulation as a liquid having a viscosity on the order of 10,000 to 50,000 (most preferably 10,000 to 30,000) centipoise at room temperature, as measured on compositions having on the order of 70% to 100% by weight resin solids.

The solvents which are suitable for mixing with the resin binders to provide this viscosity preferably are miscible with the binder. The solvents preferably have a boiling point high enough to prevent evaporation during processing, typically on the order of 75° C. to 220° C., preferably 100° C. to 220° C. Additionally, the boiling point of the solvents should be low enough to permit the solvent to evaporate within a commercially acceptable period of time to facilitate curing. The solvent may also be selected to improve the wettability of the binder to the other ingredients included in the friction element. Suitable solvents include toluene, xylene, mineral spirits, ethers, alcohols, hydrocarbons and esters.

EXAMPLES

The invention is further illustrated by the following examples, wherein all parts are by weight, unless otherwise specified. Examples 1-8 described preparations suited for the preparation of binders useful in the friction elements of the present invention. Examples 1 and 8 illustrate the first binder resin preparation method, while Examples 2-5 illustrate the second method and Examples 6 and 7 illustrate the third method, as described above.

Examples $C_1$ and $C_2$ describe control binder compositions of the type known for use in prior art friction elements. Formulations A and B describe general formulations suited to the preparation of friction elements. Friction elements made according to the invention (i.e., with resin Examples 1-8) or according to the prior art (i.e., with Control Examples $C_1$ or $C_2$) with either Formulation A or B are hereinafter identified as an example with both the resin example number and the formulation identification letter. That is, a friction element made with the resin of Example 1 according to Formulation A will be identified hereinafter as friction element Example "1A". Similarily, a friction element made with Control $C_1$ resin and Formulation B will be identified as Example "$C_1B$". The other friction elements are identified accordingly.

BINDER COMPOSITIONS

EXAMPLE 1

Nonylphenol (7280 g), phenol (6220 g) and sulfuric acid (46% aqueous, 84 g) were mixed and heated to 170° F. Paraformaldehyde (91.5%, 2275 g) was added over a 105 minute period while cooling the vessel to maintain the resultant exotherm at about 93°±10° C. After complete addition of the paraformaldehyde, the resultant mixture was stirred for approximately 2 hours, while the temperature was maintained at about 100° C. over the entire 2 hour period. Water was then removed by distillation at atmospheric temperature while heating the mixture to about 130° C. Mineral spirits (3900 g) was then added to adjust the viscosity of the resultant resin and, after cooling, isopropyl alcohol (1500 g) was added to produce 18,150 g of a 73% solids clear solution having a viscosity of 26,250 cps at 25° C.

EXAMPLE 2

Nonylphenol (7280 g), isopropyl alcohol (200 g) and sodium hydroxide solution (25%, 530 g) were mixed and heated to 77° C. Paraformaldehyde (flake, 91.5%, 2400 g) was added rapidly and the mixture held at 77° C.–80° C. for approximately 2 hours. Phenol (6220 g) was then added, resulting in a slight exotherm, and the resultant mixture was stirred at 93° C. for approximately 2 hours, followed by vacuum distillation to remove water while heating the mixture to 115° C. The resultant resin was dissolved in mineral spirits (2800 g) and, after cooling, isopropyl alcohol (1000 g) was added with stirring to produce a clear solution.

EXAMPLE 3

A mixture of nonylphenol (6000 g) paraformaldehyde (91% flake, 1980 g), isopropyl alcohol (2182 g) and sodium hydroxide solution (50%, 218 g) was stirred and heated at reflux for 5 hours at approximately 82° C. Phenol (5127 g) was then added and the resultant mixture was heated to 99° C. for an additional 2 hours. The volatile material was then distilled, first at atmospheric pressure and then under vacuum at 93° C.–105° C. Mineral spirits (500 g) was then added with stirring to produce a clear resin solution.

EXAMPLE 4

Dodecyl phenol (714.5 g) paraformaldehyde (flake, 91%, 198 g), sodium hydroxide solution (50%, 21.8 g) and isopropyl alcohol (218.2 g) were mixed and heated at 85° C. for 4 hours, with refluxing. Phenol (512.7 g) and sodium hydroxide solution (50%, 21.8 g) were then added and the mixture maintained at 100° C. for an additional 2 hours under reflux. The mixture was neutralized with acid and volatiles removed by vacuum distillation. Mineral spirits (300 g) was added with stirring to give a solution have a viscosity of 19,300 cps at 25° C.

EXAMPLE 5

Nonylphenol (6600 g), formalin (37%, 6090 g) and sodium hydroxide solution (50%, 264 g) were mixed and heated for 3 hours at 93° C. To this mixture was added phenol (3750 g) and isopropyl alcohol (150 g). When the phases had separated, the upper (aqueous) phase was removed via suction and the organic material was subjected to vacuum dehydration. Phenol (8000 g) was added and the reaction mixture was heated to 130° C., resulting in an exotherm which was moderated by refluxing. The temperature was held at approximately 145° C. while vacuum was slowly applied to remove water and unreacted phenol. Distillation was continued until the pot temperature reached 170° C. with vacuum being maintained at 28 mm Hg. Mineral spirits (4000 g) and, after cooling, isopropyl alcohol (1000 g) were added with mixing to produce a solution having a viscosity of 12,255 cps at 25° C.

EXAMPLE 6

Nonylphenol (9024 g), toluene (2000 g), sulfuric acid solution (46%, 80 g) and paraformaldehyde (flake, 91.5%, 673 g) were mixed and heated at reflux and the resultant water was removed via azeotropic distillation. After cooling, sodium hydroxide solution (50%, 361 g) was added followed by paraformaldehyde (flake 91.5%, 1354 g), resulting in a mild exotherm. The reaction temperature was maintained at 93° C. for approximately 4 hours at which time phenol (3856 g) was added followed by toluene (1000 g). The reaction mixture was heated for an additional 3 hourss during which time water was removed by azeotropic distillation. Water evolution was complete as the reaction temperature reached 127° C. Mineral spirits (4390 g) was added followed after cooling by isopropyl alcohol (1900 g), resulting in 18,600 g of a solution having a viscosity of 11,000 cps at 25° C.

EXAMPLE 7

Nonylphenol (11,000 g), toluene (2000 g), sulfuric acid solution (46%, 120 g) and paraformaldehyde (flake, 91.5%, 1310 g) were mixed and heated slowly to reflux. Water was then removed via azeotropic distillation.

After removal of the water, the mixture was made basic by the addition of sodium hydroxide solution (25%, 752 g). Paraformldehyde (flake, 91.5%, 660 g) was added with a slight exotherm to the reaction mixture which was maintained at 93° C. under reflux for an additional 3 hours. Phenol (1880 g) was added and azeotropic distillation of water was resumed. After water evolution ceased, mineral spirits (1900 g) was added, followed, after cooling, by isopropyl alcohol (1100 g), yielding 18,315 g of a solution having a viscosity of 12,900 cps at 81.% solids.

EXAMPLE 8

Nonylphenol (660 g), phenol (494 g), toluene (100 g) and sulfuric acid (100 cc conc. plus 10 cc H$_2$O) were mixed and heated to 80° C. Paraformaldehyde (powder, 95%, 166 g) was added in portions to maintain the reaction temperature at approximately 100° C. Toluene (100 cc) was added to aid stirring. Water (98 g) was removed by azeotropic distillation with the reaction temperature increasing to 127° C. Mineral spirits (100 g) were added with mixing to give a solution with viscosity of 80,000 cps at 25° C.

CONTROL EXAMPLE C$_1$

Binder system containing acid-bodied cashew nut shell liquid (2 parts) and oil modified phenolic resin.

CONTROL EXAMPLE C$_2$

Two parts bodied cashew nut shell liquid and one part bodied linseed oil.

PREPARATION OF FRICTION MATERIAL

The binder compositions described above as Examples 1-8 and Control Examples C$_1$ and C$_2$ were utilized to prepare friction elements according to the present invention. The friction elements were prepared of conventional formulations using conventional methods. Two such formulations are set forth below respectively as Formulations "A" and "B".

Formulation A

| Ingredients | Parts |
| --- | --- |
| Resin solids | 20 |
| Asbestos fibers 7D | 60 |
| Barium sulfate, technical grade powdered | 20 |

The ingredients were mixed in a Baker-Perkins Sigma-Type Mixer for approximately 30 minutes, then pressed at 500 psi into flat discs approximately 4.0 inches in diameter and about 0.5 inch thick. These discs were dried for 24 hours at 21° C. to remove solvent and then cured in a cam-programed air circulating oven with a uniformly constantly rising temperature over an 8 hour period from 38° C. to 149° C. and then heated at 149° C. for 4 hours and at 350° F. (177° C.) for an additional 4 hours.

Formulation B

| Ingredients | Parts |
| --- | --- |
| Resin (80% solids) | 24.2 |
| Asbestos 7F | 57.2 |
| Friction particles the size which passes through 40 mesh sieve prepared by grinding fully cured cashew nut shell liquid polymer (available under the trade designation "Cardolite" NC-104-40) | 14.3 |
| Hexamethylene Tetramine | 1.7 |
| Lead oxide (Litharge) | 1.7 |
| Hydrous calcium silicate | 0.9 |

This formulation was employed to produce roll-molded brake linings. The ingredients were mixed on a Littleford-Lodige mixer having a water cooled mixing chamber by mixing all dry ingredients for approximately 3 minutes with mixer plows and spinners on, adding the liquid resin and blending therein for an additional 15 minutes with the subsequent addition of 4 parts water with an additional 15 minutes blending. The resultant blended mass was roll-molded between counter-rotating commerical molding equipment to produce a spiral shape having a curvature corresponding to the curvature of brake lining. The resultant roll-molded strip was approximately ⅜ inch thick, this subsequently being ground after curing to approximately ¼ inch thick. The roll-molded strip was heated in an oven at 70° C. to remove solvent and cured by heating for an additional 2 hours and 40 minutes at 205° C.

TEST PROCEDURES

Testing was conducted on certain of the examples. Friction materials prepared as described were tested to determine their suitability as brake lining material, both in laboratory tests and in actual use tests.

LABORATORY TESTING

The laboratory testing involved two types of constant input testing and one type of constant output testing. The first constant input test was Society of Automotive Engineers (SAE) Brake Lining Quality Control Test Procedure J-661a of the Society of Automotive Engineers as set forth on pages 31.59–31.61 in Society of Automotive Engineer's Book, 1979, to determine the coefficient of friction under normal conditions (about 93° C./200° F.) and under conditions where the brake lining has been heated (usually about 293° C./560° F.) after continuous braking.

The results of such testing are shown in Table I below.

TABLE I

| Example | Coefficient of Friction (normal) | Coefficient of Friction (hot) |
| --- | --- | --- |
| 1A | .375 | .435 |
| 2A | .405 | .423 |
| 3A | .345 | .386 |
| 4A | .368 | .379 |
| 5A | .358 | .404 |
| 6A | .345 | .372 |
| 7A | .370 | .400 |
| 8A | — | — |
| 1B | .440 | .373 |
| 2B | .438 | .418 |

TABLE I-continued

| Example | Coefficient of Friction (normal) | Coefficient of Friction (hot) |
| --- | --- | --- |
| 3B | .435 | .382 |
| 4B | — | — |
| 5B | .435 | .376 |
| 6B | .443 | .383 |
| 7B | .435 | .359 |
| 8B | — | — |
| $C_1B$ | .473 | .403 |

A useful friction element will have a coefficient of friction of at least 0.30 both under normal conditions and under hot conditions.

The second constant input test is similar to SAE Standard Test J-661a. The test specimen is conditioned by running it at 312 rpm (15 fps) at 100 psi contact pressure and a maximum drum temperature of 93° C. (200° F.) for a minimum of 20 minutes to obtain at least 95% contact between the surface of the test sample and the drum. Thereafter, the sample initial thickness and weight are determined and the test begun. A base line is obtained by running the drum at 417 rpm for 10 seconds with a 150 psi load applied between the sample and drum surface and 20 seconds with the load removed for 20 on-off cycles. The test is then commenced at a drum temperature of 93° C.±10° C. (200° F.±20° F.), with this temperature limit being maintained throughout this portion of the test. The coefficient of friction is recorded every fifth application. The drum is then run continuously at 150 psi and 417 rpm with the drum heater activated and the drum cooling system deactivated, starting at 93° C. (200° F.) and running until 345° C. (650° F.) is obtained or until the coefficient of friction drops below 0.2, whichever occurs first, for the first "fade" run. During this time, temperature readings and frictional force readings are simultaneously noted at 14° C. (25° F.) intervals and the time required to reach each 56° C. (100° F.) interval and to reach 345° C. (650° F.) is noted.

Immediately following the completion of the first fade run, the first recovery run is carried out, wherein the drum heater is deactivated and the drum cooling is activated and a 10 second braking application at each 56° C. (100° F.) interval is made, while cooling from 315° C. (600° F.) to 93° C. (200° F.), while recording the coefficient of friction for each application. A second fade run is completed immediately following the first recovery run by deactivating the drum cooling and activating the drum heating and running the drum with a continous drag at 150 psi and 417 rpm, starting at 56° C. (100° F.) and running for 20 minutes or until 482° C. (900° F.) is reached, whichever occurs first. The run is stopped if the coefficient of friction drops below 0.2. Simultaneous friction force and drum temperature readings are taken at 14° C. (25° F.) intervals. The time to reach each 56° C. (100° F.) interval and the time to reach 482° C. (900° F.) is recorded. Immediately after completion of the second fade run, the heater is deactivated and cooling activated and a 10 second braking application is made at each 56° C. (100° F.) interval while cooling from 371° C. (700° F.) to 93° C. (100° F.).

Results of this testing are shown in Table II below. (Second fade results)

TABLE II

| Ex. | Coefficient of Friction | | | | Time (min) |
|---|---|---|---|---|---|
| | 316° C. (600° F.) | 371° C. (700° F.) | 427° C. (800° F.) | 482° C. (900° F.) | |
| 1A | — | 0.52 | 0.54 | 0.57 | 12 |
| 2A | 0.42 | 0.46 | 0.42 | 0.44 | 13.4 |
| 3A | 0.47 | 0.49 | 0.48 | 0.52 | 12.7 |
| 4A | — | — | — | — | — |
| 5A | 0.49 | 0.48 | 0.44 | 0.46 | — |
| 6A | 0.45 | 0.45 | 0.33 | 0.45 | 17.3 |
| 7A | 0.44 | 0.43 | 0.41 | 0.47 | 14.1 |
| 8A | 0.45 | 0.50 | 0.53 | 0.52 | 7.4 |
| $C_1A$ | — | — | — | — | — |
| 1B | 0.37 | 0.38 | 0.33 | 0.65 | 14.7 |
| 2B | 0.36 | 0.41 | 0.38 | 0.64 | 14.7 |
| 3B | 0.34 | 0.39 | 0.34 | 0.56 | 16.3 |
| 4B | — | — | — | — | — |
| 5B | 0.39 | 0.42 | 0.38 | 0.64 | 14.9 |
| 6B | 0.38 | 0.38 | 0.32 | 0.62 | 16.5 |
| 7B | 0.37 | 0.36 | 0.31 | 0.38 | 17.9 |
| $C_1B$ | 0.39 | 0.30 | 0.22 | <0.20 | — |
| $C_2B$ | 0.26 | <0.20 | — | — | — |

The constant output test, designated Friction Assessment Screening Test (FAST), is widely used in the industry. The test involves contacting a sample against a disc running at constant speed at a force which is varied to produce a constant drag. The test results revealing the maximum and minimum coefficient of friction and the sample wear are reported in Table III below.

TABLE III

| Ex. | Coefficient of Friction | | Wear (in$^3$ × 10$^{-3}$/HP-Hours) |
|---|---|---|---|
| | (Max.) | (Min.) | |
| 1A | 0.54 | 0.32 | 15.9 |
| 2A | 0.44 | 0.27 | 16.9 |
| 3A | 0.45 | 0.28 | 12.4 |
| 4A | | | |
| 5A | 0.45 | 0.30 | 14.3 |
| 6A | 0.45 | 0.31 | 12.0 |
| 7A | 0.57 | 0.39 | 13.5 |
| 1B | 0.57 | 0.30 | 19.4 |
| 2B | 0.55 | 0.33 | 17.1 |
| 3B | 0.56 | 0.30 | 15.7 |
| 4B | | | |
| 5B | 0.58 | 0.29 | 18.8 |
| 6B | 0.57 | 0.31 | 17.1 |
| 7B | 0.58 | 0.54 | 15.6 |
| $C_1B$ | 0.54 | 0.52 | 9.0 |
| $C_2B$ | 0.52 | 0.42 | 10.3 |

ACTUAL USE TEST

In an actual use test, the friction materials described above were employed as brake linings for the rear wheels of a stock 1977 Oldsmobile Cutlass Sedan. The test was run to determine the efficiency of the brake linings at various temperatures. One run consists of two cycles, each cycle having a heating and cooling mode. Testing in the heating mode is called the "fade" test. Testing in the cooling mode is called the "recovery" test. During each part of the test, a number of stops were made at defined deceleration rates and the pedal effort as evidenced by line pressure were recorded.

The front disc brakes of the automobile were disconnected and only the rear brakes employed to provide the braking force. The rear line pressure was modified to by-pass the brake fluid proportioning valve. The test brake lining materials were cut to the appropriate size and installed on the brakeshoes with the appropriate arc to provide proper alignment with the brake drum. The thickness of the lining was measured before and after the test.

After making one or two initial stops to ascertain that the heat monitoring means mounted in the brake shoes were operating, the automobile was utilized to make a 60 mile per hour fade test and a 30 mile per hour recovery test, with no previous burnishing of the pads. This was accomplished by accelerating the automobile to 60 miles an hour, making the first stop at a deceleration of 3 feet per second squared, rapidly accelerating to 60 miles per hours in 0.4 miles, and repeating this cycle for 10 stops, while monitoring the line pressure for each of the stops. The maximum line pressure was noted, as was the number of stops to first reach the maximum line pressure.

Similarly, during the recovery test, the automobile was driven one mile at 40 miles per hour, slowed to 30 miles per hour to allow the brakes to cool slightly without brake application, and then stopped to make the first recovery stop at a deceleration rate of 3 feet per second squared. The brakes were then cooled to 66° C. (150° F.) and the same cycle was repeated, except with 12 recovery stops. Thereafter, the thickness of the brake lining was measured and the differences reported in the table as "wear". The results are reported in Table IV below.

TABLE IV

| Ex. | Fade 2 | | Recovery 2 | | Wear (in × 10$^{-3}$) |
|---|---|---|---|---|---|
| | Maximum Line Pressure (psi) | Number of Stops to Maximum Line Pressure | Maximum Line Pressure (psi) | Number of Stops to Maximum Line Pressure | |
| 1B | 420 | 7 | 620 | 1 | 4 |
| 2B | 380 | 4 | 340 | 2 | 7 |
| 3B | 420 | 11–15 | 440 | 1 | 4 |
| 4B | — | — | — | — | — |
| 5B | 380 | 8 | 350 | 1 | 11 |
| 6B | 320 | 8 | 160 | 2 | 13 |
| 7B | 340 | 13 | 580 | 3 | 15 |
| $C_1B$ | 680 | 12 | 780 | 3 | 10 |

What is claimed is:

1. In a friction element of the type which is composed of cured organic thermosettable binder having filler dispersed and bonded therein; the improvement comprising employing as said binder a curable mixture comprising a reaction product of:
   (a) phenol
   (b) formaldehyde; and
   (c) monalkyl phenol having from 4 to about 20 carbon atoms in the alkyl group, the mole ratio range of phenol:alkyl phenol:formaldehyde being about 2:1–5:1–7 and the number of moles of phenol and alkylphenol combined exceeding the number of moles of formaldehyde.

2. The friction element of claim 1 wherein said alkylphenol is nonylphenol.

3. The friction element of claim 1 wherein the mole ratio of phenol:alkyl phenol:formaldehyde is 2:1:2.

4. The friction element of claim 1 wherein the mole ratio of phenol:alkyl phenol:formaldehyde is 2:1.14:2.

5. In a method of preparing a friction element by mixing liquid curable organic thermosettable binder with filler, forming the mixture into a desired shape, and curing the binder; the improvement comprising employing as said liquid binder a curable mixture comprising a reaction product of:
(a) phenol;
(b) formaldehyde; and
(c) alkyl phenol having from 4 to 20 carbon atoms in the alkyl group, the mole ratio range of phenol:alkyl phenol:formaldehyde being about 2:1–5:1–7 and the number of moles of phenol and alkylphenol combined exceeding the number of moles of formaldehyde.

* * * * *